INVENTOR
Paul D. Newhouse

United States Patent Office 3,040,317
Patented June 19, 1962

3,040,317
TRACK-WHILE-SEARCH PASSIVE DETECTION AND DIRECTION FINDING APPARATUS
Paul D. Newhouse, Linthicum Heights, Md., assignor to Westinghouse Electric Corporation, East Pittsburgh, Pa., a corporation of Pennsylvania
Filed Feb. 13, 1957, Ser. No. 640,052
11 Claims. (Cl. 343—117)

This invention relates to passive detection and direction finding apparatus, and more particularly to passive detection and direction finding apparatus for tracking a selected target or source of pulsed radiant energy while at the same time searching for other sources, and providing directional information with respect to all of the sources including the target or source which is being tracked as well as other sources not being tracked.

Passive detection and direction finding apparatus, as the name implies, is detection and direction finding apparatus having no source of radiant energy but utilizing a source of radiant energy located elsewhere for obtaining directional information about the source with respect to the location of the passive direction finding apparatus and also for obtaining other information, for example, the closing time between the source and the passive detection and direction finding apparatus where there is relative motion between these two.

In some prior art passive detection and direction finding apparatus, the error in the directional information is so great that the apparatus is unsuitable for use in advanced defense systems. For example, an error in the order of 6 to 8 degrees R.M.S. is frequently encountered in prior art passive detection and direction finding apparatus. In addition, prior art passive detection and direction finding apparatus is lacking in the ability to select one target for tracking purposes, and about which more accurate directional information is to be supplied, while providing directional information of somewhat lesser accuracy about a number of other targets.

The apparatus of the instant invention overcomes these and other disadvantages of the prior art. It employs a movable antenna array having a number of antennas to provide angle tracking data on a selected target with an error which may be in the order of 1 degree, and at the same time provide directional data on other targets with somewhat lesser accuracy. These advantages are provided by apparatus which includes a pulse selector or target discriminator which separates the desired signal or the target to be tracked from the other targets, and utilizing the selected signal to produce an error signal which controls the tracking antenna positioning. Means is provided to compensate for amplitude variations in the received signals, so that the error signal is in effect produced by a single crystal-video receiver channel, and thus, the need for precisely balanced channels is eliminated.

Accordingly, it is a primary object of the instant invention to provide new and improved passive detection and direction finding apparatus.

Another object is to provide new and improved passive detection and direction finding apparatus which will provide angle tracking data on a selected target with a small error while providing directional information on other targets.

Another object is to provide new and improved tracking passive detection and direction finding apparatus employing a target discriminator for separating a desired signal to be tracked from other signal sources.

A further object is to provide new and improved passive detection and direction finding apparatus having new and improved means for tracking a target.

Still a further object is to provide new and improved passive detection and direction finding apparatus having new and improved means for angle tracking a signal which varies in amplitude at a rapid rate.

Other objects and advantages will become apparent after a study of the following specification when read in connection with the accompanying drawings, in which.

Figure 1:
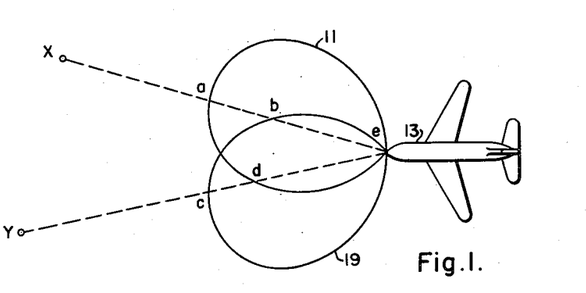
FIGURE 1 is a view illustrating directional patterns of response of two of the antenna means of the instant invention, while the apparatus of the instant invention is employed for searching purposes only and for providing directional information about one or more tragets or sources of pulsed radiant energy.
Figures 3, 7:
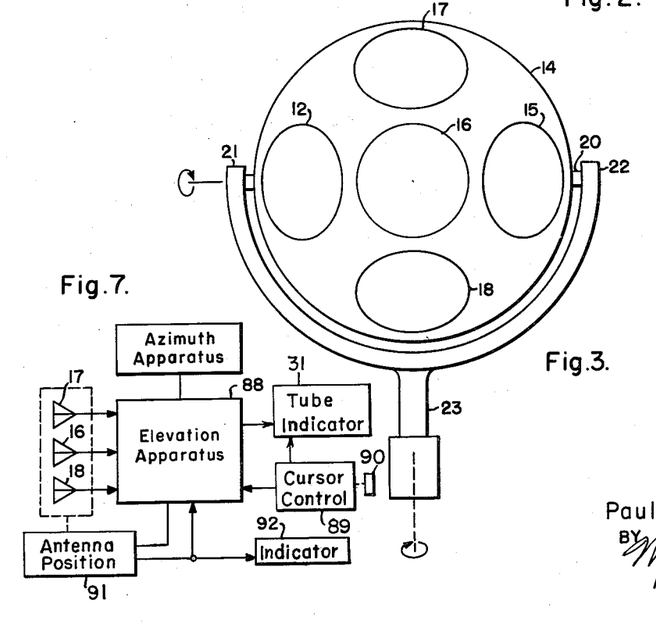
FIG. 3 is a front elevational view of antenna means suitable for use in the instant invention.
FIG. 7 is a diagram, in block form, of the elevation circuit of the invention.

Particular reference should be made now to the drawings for a more complete understanding of the invention, in which like reference characters are used throughout to designate like parts, and in particular to FIG. 1 thereof, in which the reference numeral 11 designates the lobe or pattern of response of one antenna 12 mounted on the aircraft 13. For convenience of illustration and description, the passive detection and direction finding apparatus is described in connection with its use on aircraft, but it should be understood that the passive detection and direction-finding apparatus of the instant invention may be located on the ground, if desired. Antenna 12, shown in FIG. 3, to which particular attention is now directed, is mounted upon a suitable mounting plate 14, the mounting plate 14 having four other antennas 15, 16, 17 and 18 also mounted thereon, the antenna 15 having a pattern of response illustrated by the lobe 19 of FIG. 1. Assuming for the purposes of description that the view of FIG. 3 is a front elevational view of the antennas as seen from a point in front of the aircraft 13 while the mounting plate is in its normal position, the radiation axis of the center antenna 16 may conveniently be substantially coincident with the longitudinal axis of the aircraft, or may lie in a "dead ahead" direction, the angle of attack of the aircraft being neglected for the purposes of this description. The antenna mounting plate 14 and all of the antennas thereon are adapted to be moved together in both elevation and azimuth. Movement in elevation is accomplished by rotating the shaft 20 which is journalled for rotation in arms 21 and 22, movement of the shaft 20 about its axis being accomplished by positioning apparatus of any convenient design, not shown in FIG. 3. Movement of the antennas in azimuth is accomplished by rotating the yoke member 23 about its axis, and antenna controller means shown in block form in FIGS. 4 and 5 and designated 24, is provided for this purpose. The antenna controller means may be of any convenient conventional design, and includes means for turning the antennas to the left or right, and in varying amounts, in accordance with variations in the polarity and amplitude of an error signal applied thereto. Antenna controller 24 also includes means for generating or obtaining at least one voltage or signal which varies with variations in azimuth, to thereby provide accurate azimuth data.

Figure 4:
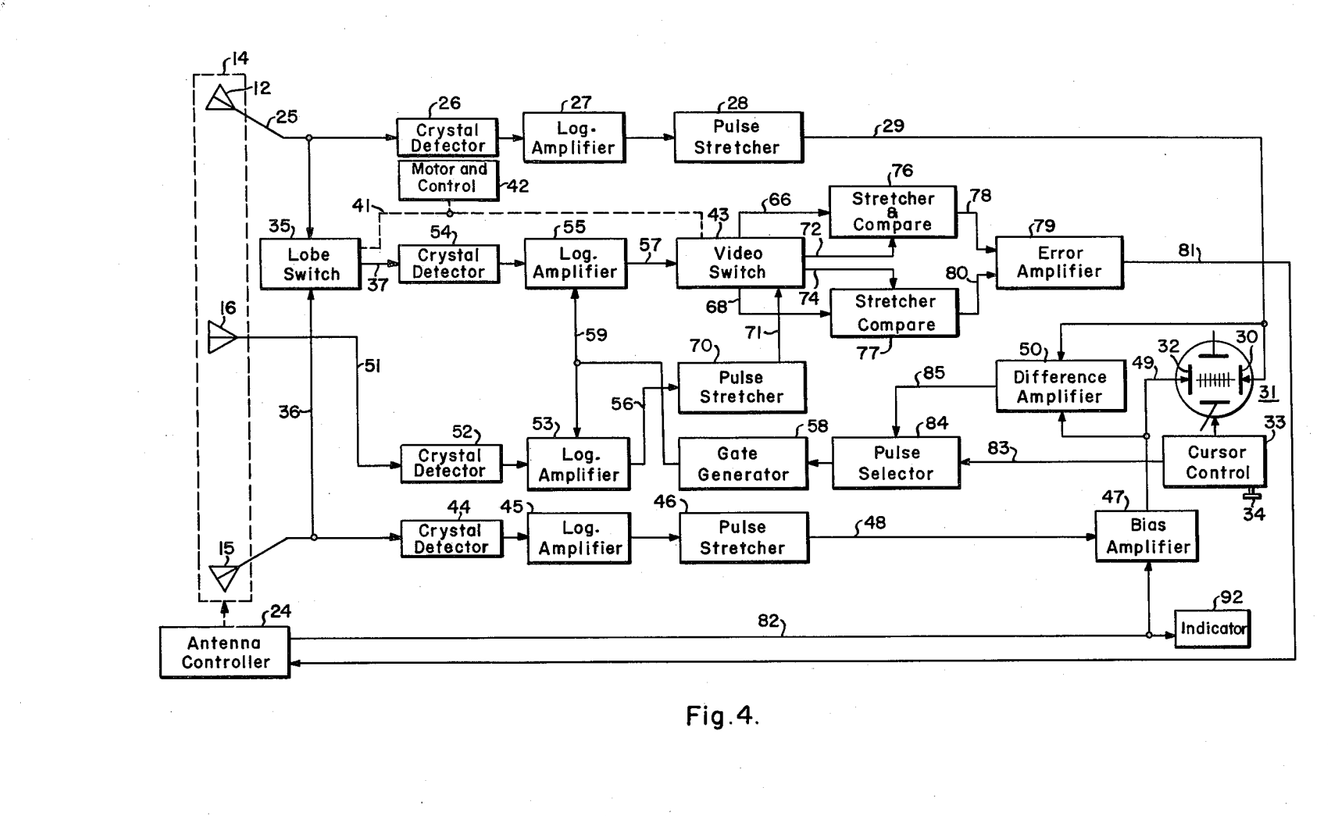
FIG. 4 is a schematic electrical circuit diagram, in block form, of apparatus constructed according to the preferred embodiment of the instant invention.

Particular reference should be paid now to FIG. 4 in which there is shown, in block form, azimuth apparatus according to the instant invention as energized from the aforementioned antennas 12, 16 and 15. It should be understood that apparatus similar to that of FIG. 4 is provided for elevation information, employing antennas 17, 16 and 18. Antenna 12 supplies its output by conducting means 25, which may be of any convenient design, to a crystal detector shown in block form and designated 26. The output of the crystal detector 26 is supplied to an amplifier 27 which is preferably of the logarithmic type, and the output of the amplifier 27 is supplied to a pulse stretcher 28 which may be of conventional design. Pulse stretcher 28, and the other pulse stretchers employed and hereinafter to be mentioned may have circuits similar to a circuit known in the art as a "box car" circuit, and may each include a diode, bucket condenser, and discharge triode, suitable means, not shown, being provided for controlling the charging and discharging of the bucket condenser. The stretched or broadened pulse obtained from pulse stretcher 28 is supplied by way of connecting means 29 to one deflection plate 30 of a cathode ray tube indicator generally designated 31. The aforementioned deflection plate 30 is one of a pair of horizontal deflection plates, the other plate of the pair being designated 32 and provided for purposes to be hereinafter more clearly apparent. The cathode ray tube means, generally designated 31, also has a pair of vertical deflection plates, and it should be understood that it includes means for forming a beam, not shown, and preferably has an intensity control grid, not shown. Preferably the cathode ray tube 31 has special means, not shown, for providing for a cursor which may be shifted left or right to any point on the screen thereof by an azimuth cursor control shown in block form and designated 33. If desired, the cathode ray tube 31 may have additional beam forming means, not shown, and additional pairs of deflection plates, not shown, the deflection voltages of the horizontal pair of additional plates of which are under the control of the cursor control 33, the manually operated knob or other device 34 being provided for moving the cursor left or right to any point within the azimuth scale of the tube screen. Similar cursor control apparatus, not shown in FIG. 4, including a manual control, not shown in FIG. 4, is provided for use in elevation apparatus, not shown in FIG. 4, the elevation cursor manual control moving the cursor up or down to any point within the elevation scale of the tube screen. Preferably, the cursor is in the form of a small circular trace which may be moved to encircle the luminous spot representing the target selected to be tracked.

Figure 5:
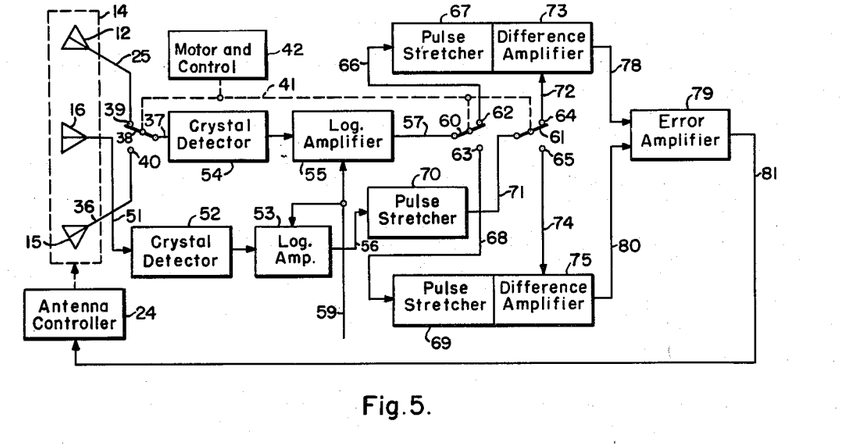
FIG. 5 is an electrical circuit diagram, in block form, of only the tracking portion of the apparatus according to the instant invention.

The aforementioned antenna 12 also supplies an output by way of the aforementioned conducting means 25 to a lobe switch, shown in block form and designated 35. The lobe switch 35 may be of conventional design and is provided for alternately connecting the conducting means 25 connected to antenna 12, and conducting means 36 operatively connected to the aforementioned antenna 15, to conducting means 37. In FIG. 5 the lobing switch 35 is seen to include a switch arm 38 connected to conducting means 37, and switch contacts 39 and 40 connected to conducting means 25 and 36, respectively. The switch arm 38 is moved by shaft means 41 energized from motor and control means of any convenient design and shown in block form at 42. Shaft 41 is also connected to a video switch shown in block form in FIG. 4 and designated 43, the video switch being provided for purposes to be hereinafter more clearly apparent.

The aforementioned antenna 15 supplies an output by way of the aforementioned conducting means 36 to a crystal detector 44 which may be similar to the aforementioned crystal detector 26. Crystal detector 44 supplies its output to a logarithmic amplifier 45 which may be similar to the aforementioned logarithmic amplifier 27, amplifier 45 supplying its output to a pulse stretcher 46 which may be similar to the aforementioned pulse stretcher 28. Pulse stretcher 46 supplies its output to a bias amplifier 47 by way of conducting means 48, the bias amplifier 47 being connected by way of conducting means 49 to the aforementioned deflection plate 32. The bias amplifier 47 also supplies an output by way of conducting means 49 to a difference amplifier shown in block form and designated 50, the difference amplifier 50 also receiving an input from the aforementioned pulse stretcher 28 by way of lead 29 and being provided for purposes to be made hereinafter more clearly apparent.

The aforementioned center antenna 16 of FIG. 3 is operatively connected by way of conducting means 51 to supply an input to a crystal detector shown in block form and designated 52, the detector 52 supplying its output to a logarithmic amplifier shown in block form and designated 53.

The aforementioned lobe switch 35 supplies its output by way of aforementioned conducting means 37 to a crystal detector shown in block form at 54, the detector 54 supplying its output to a logarithmic amplifier 55 which may be similar to the aforementioned logarithmic amplifier 53. Logarithmic amplifiers 53 and 55 are constructed and arranged to supply outputs on respective leads 56 and 57 only while both the amplifiers are receiving a gate supplied by gate generator 58 and conducted to the logarithmic amplifiers by lead means 59. The output of the aforementioned logarithmic amplifier 55 is supplied by way of the aforementioned conducting means 57 to the aforementioned video switch 43 which, as shown in FIG. 5, comprises a pair of switch arms 60 and 61, the switch arm 60 having contacts 62 and 63 associated therewith, and the switch arm 61 having contacts 64 and 65 associated therewith, the arms 60 and 61 being ganged together and simultaneously operated from the aformentioned linkage 41 in synchronism with the operation of lobe switch 35. The output of the video switch obtained from contact 62 of FIG. 5 is supplied by way of conducting means 66 to a pulse stretcher 67, whereas contact 63 is connected by conducting means 68 to a pulse stretcher 69.

The aforementioned logarithmic amplifier 53 energized from the center antenna 16 supplies its output by way of the aforementioned conducting means 56 to a pulse stretcher shown in block form at 70, and the pulse stretcher 70 has its output applied by way of conducting means 71 to the aforementioned switch arm 61, FIG. 5. Contact 64, FIG. 5, is connected by way of conducting means 72 to a comparing circuit or difference amplifier shown in block form at 73, the difference amplifier 73 being operatively connected to the aforementioned pulse stretcher 67 to receive an output therefrom. The aforementioned contact 65 is connected by way of conducting means 74 to a difference amplifier or comparing circuit shown in block form at 75, the difference amplifier 75 being operatively connected to the aforementioned pulse stretcher 69 to receive an output therefrom.

The aforementioned pulse stretcher 67 and aforementioned difference amplifier 73 are, for convenience of illustration, shown in a single block designated 76 in FIG. 4, and the aforementioned pulse stretcher 69 and aforementioned difference amplifier 75 are, for convenience of illustration, shown in a single block designated 77 in FIG. 4.

The output of the aforementioned difference amplifier 73, FIG. 5, is applied by way of conducting means 78 to a difference amplifier 79, which may be of conventional design, the difference amplifier 79 also having applied thereto by way of conducting means 80 the output of the aforementioned difference amplifier 75. Difference amplifier 79 from the two inputs applied thereto produces an error signal on output lead means 81 which is applied to antenna controller 24 and utilized by the controller to turn or position the antennas 12, 16 and 15 in azimuth.

In the apparatus of FIG. 4, for convenience in describing the invention, the two modes of operation thereof will be described separately, that is, the search mode, and the track-while-search mode of operation.

In the searching mode of operation radiant energy received from source X, FIG. 1, because of the directional pattern of response 11 of antenna 12 provides a pulse output from crystal detector 26 corresponding in amplitude to the distance $a$—$e$ of FIG. 1 whereas because of the pattern of response 19 of antenna 15 the output of crystal detector 44 has an amplitude corresponding to the distance $b$—$e$. These pulses are amplified by the logarithmic amplifiers 27 and 45, respectively, and their relative amplitudes retained unchanged. The outputs of amplifiers 27 and 45 are of the same polarity, and are applied to pulse stretchers 28 and 46, respectively, and the stretched pulse from pulse stretcher 28 is applied by way of lead 29 to the aforementioned deflection plate 30. The stretched pulse output from pulse stretcher 46 is supplied by way of lead 48 to the aforementioned bias amplifier 47. The bias amplifier 47 is constructed and arranged whereby, while antennas 12 and 15 are in their normal positions, that is, while the mounting plate 14 is in the position shown, the pulse on lead 48 is applied by way of output lead 49 to the deflection plate 32 and difference amplifier 50 without substantial alternation in its amplitude. The bias amplifier 47 is further constructed and arranged to alter the amplitude of the pulse on lead 49 in accordance with changes in the angular setting in azimuth of the antennas 12, 16 and 15, to thereby provide for maintaining the true search calibration of the screen of the cathode ray tube as the antennas are moved in order to track a selected target or source of pulsed radiation.

The pulses on the aforementioned plates 30 and 32 being of the same preselected polarity but of different amplitudes as aforementioned, the beam of the cathode ray tube 31 is deflected toward the right as seen in FIG. 4, that is, toward plate 30 to indicate that the source or target X lies to the right of the dead-ahead direction from the aircraft.

On the other hand, energy arriving at the passive detection and direction finding apparatus from target or source Y, FIG. 1, while the apparatus is in its searching mode of operation will provide a pulse output from detector 26 corresponding in amplitude to the distance $d$—$e$ while a pulse amplitude from detector 44 will have an amplitude corresponding to the distance $c$—$e$, with the result that the pulse supplied to deflection plate 32 has a greater amplitude than the pulse supplied to deflection plate 30 and a luminous spot, not shown, occurs on the screen of the cathode ray tube left of the center thereof indicating that the target or source Y lies to the left of the dead-ahead direction. If desired, the logarithmic amplifiers 27 and 45 may both supply pulse outputs to a summing circuit, the summing circuit, not shown, providing an intensifier pulse for application to the aforementioned intensity control grid, not shown, of the cathode ray tube 31.

Figure 2:
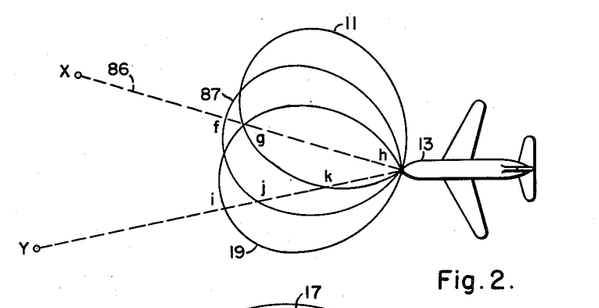
FIG. 2 is a view of the directional patterns of response of a set of three of the antenna means of the instant invention, while the instant invention is being used in a track-while-search mode of operation.

Particular attention should be paid now to FIG. 2 which shows the lobes or patterns of response of the antennas 12, 16 and 15 while the apparatus is in its search-while-track mode of operation. According to FIG. 2, the antenna mounting plate has been rotated about the axis of yoke member 23 so that the axis of radiation of antenna 16 or the common axis perpendicular to the plate 14 is represented by the line 86. As before, the patterns of response of the antennas 12 and 15 are represented by the lobes 11 and 19, respectively, whereas the pattern of response of the antenna 16 is represented by the lobe or pattern 87. It should be noted that while the apparatus is tracking the target or source X, the energy supplied to antennas 12 and 15 is substantially equal as represented by the line $g$—$h$ which is the same length in both patterns of response 11 and 19, and that the distance $f$—$h$ representing the amount of energy received by the antenna 16 is greater than the distance $g$—$h$, as will become more clearly apparent.

Particular reference should be made now to FIG. 5 which is a block diagram illustrating the apparatus which is employed in tracking a target, for example, the target or source X of FIG. 2. As aforementioned, the operator of the apparatus by manipulating the manual control 34 of the cursor control apparatus 33 moves the cursor on the screen of the cathode ray tube 31 until it coincides with or surrounds the target which it is desired to track. The cursor control may be constructed and arranged to, by way of conductor or connecting means 83, control the amplitude of bias voltages, and control switching circuits, for pulse selection in the pulse selector 84.

The purpose of the pulse selector or pulse discriminator 84 is to cause a gate to be generated by gate generator 58 when, and only when, a pulse of energy is received from the target to be tracked. To this end, the outputs of pulse stretchers 28 and 46 representing by their relative pulse amplitudes the radiant energy received by antennas 12 and 15 are applied to an aforementioned difference amplifier 50, which provides a pulse input by way of conductor means 85 to the pulse selector 84 which may have a polarity and amplitude representing the difference between the pulse amplitudes applied thereto.

As aforementioned, deflection of the beam of the cathode ray tube 31 right or left in any given amount also depends upon a similar difference in pulse amplitudes. Accordingly, the pulse selector or pulse discriminator 84 is constructed and arranged to pass to the gate generator 58 for gate producing purposes only pulses on lead 85 having preselected amplitudes corresponding to the cursor position.

Whereas any suitable pulse selector circuit may be employed, a pulse selector circuit described in a copending application of Paul D. Newhouse for Passive Detection and Direction Finding Apparatus and Target Discriminator for use therein, Serial No. 640,051, filed February 13, 1957, now Patent No. 2,931,032, and assigned to the assignee of the instant invention, is suitable for the purpose.

Although the particular circuit of pulse selector 84 forms no part of the instant invention, to facilitate an understanding of the subject apparatus a brief description of a suitable circuit follows.

The pulse selector 84 may include means under control of the cursor control 33 for reversing the polarity of pulses applied thereto as the cursor moves left or right from the zero azimuth position, and may include a pair of biased rectifier tubes, each adapted to pass only pulses of at least a predetermined amplitude, the amplitudes being different from each other. The outputs of the biased rectifier tubes are separately amplified, and thence the output of the rectifier for the pulse of lower amplitude is applied to a gate circuit. The amplified output of the rectifier tube for the pulse of higher amplitude is inverted and also applied to the gate circuit to block the passage of pulses therethrough. Accordingly, only pulses are passed by the gate circuit having an amplitude at least as great as a preselected lower limit and not greater than a preselected higher limit, these limits being varied in accordance with variations in the setting of the cursor control. Pulses meeting the requirements of the pulse selector 84 are passed to the gate generator 58, this occurring every time a pulse is received from the target or source represented by the spot within the cursor. The gate supplied on lead 59 allows the signals from the desired target only to progress through the tracking channel including logarithmic amplifier 55. As aforementioned, this tracking channel is energized alternately by the outputs of antennas 12 and 15 which are applied by conducting means 25 and 36 to lobe switching means 35 and thence by way of conducting means 37 to the aforementioned crystal detector 54 the output of which is supplied to the aforementioned logarithmic amplifier 55. As aforementioned, the motor and control apparatus 42 by shaft means 41 periodically operates the lobe switch to alternately connect the two antennas 12 and 15 to supply their outputs to the crystal detector 54 at a predetermined period of alternation. The aforementioned gate on lead 59 also allows the signals from the desired target only to progress through the center channel, that is, the channel energized from center antenna 16 and including the logarithmic amplifier 53 energized from crystal detector 52. The aforementioned video switch 43 which is also energized or controlled by shaft 41 in synchronism with the lobe switch 35 alternately connects the output of the logarithmic amplifier 55 to a pair of pulse stretchers 67 and 69, the outputs of which are applied to a pair of difference amplifiers 73 and 75 respectively both of which also have applied thereto the stretched output of the aforementioned logarithmic amplifier 53. As aforementioned, the outputs of the difference amplifiers 73 and 75 are applied by way of leads 78 and 80 to a difference amplifier 79 and the output thereof is applied by way of conducting means 81 to the aforementioned antenna controller 24. The error signal from difference amplifier 79 which controls the antenna position is accordingly obtained by lobe comparison and as aforementioned, when the antenna array is "on-target" the right and left antennas have substantially equal outputs.

Figure 6:
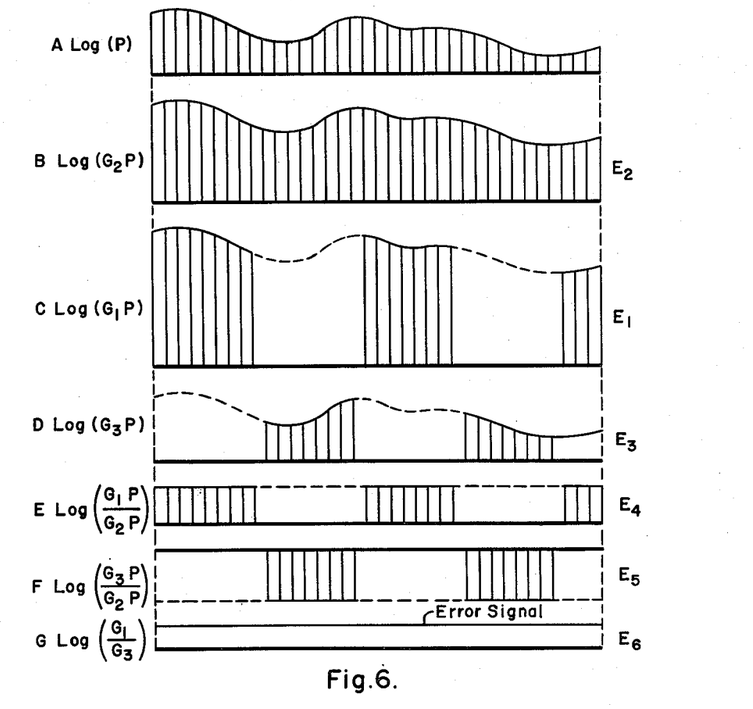
FIG. 6 shows a number of graphs illustrating the operation of the apparatus of FIG. 5.

As previously mentioned, one of the problems associated with lobing is that a received signal may vary in amplitude in any sort of random manner, as illustrated by the curve or graph A of FIG. 6, in which the logarithm of the power P of an impinging signal is plotted against time and the signal is shown to have amplitude modulation of a large percentage value. In curve B of FIG. 6 there is represented a voltage corresponding to the log of $G_2P$ where $G_2$ represents the gain of the aforementioned center antenna 16. A voltage $E_2$ will accordingly exist on the output lead 56 of the logarithmic amplifier 53 and will be applied to the pulse stretcher 70. In a like manner, the curve C of FIG. 6 represents the log of $G_1P$ where $G_1$ is the gain of the antenna 12, and correspondingly a voltage $E_1$ is provided by the logarithmic amplifier 55 and applied by way of conducting means 66 to the pulse stretcher 67. Also, in like manner the curve D of FIG. 6 represents the logarithm of $G_3P$ where $G_3$ is the gain of antenna 15, and a corresponding voltage $E_3$ is obtained from logarithmic amplifier 55 and applied by way of conducting means 68 to pulse stretcher 69. It should be noted that the curves C and D of FIG. 6 represent alternate lobing as hereinbefore described. The curve E of FIG. 6 represents the log of $$\left(\frac{G_1P}{G_2P}\right)$$

after stretching or averaging, and accordingly, a voltage $E_4$ is provided in the output of the aforementioned difference amplifier 73 and applied to lead 78 and difference amplifier 79. The curve F of FIG. 6 represents the log of $$\left(\frac{G_3P}{G_2P}\right)$$

after averaging or stretching, and a voltage $E_5$ is accordingly obtained from the output of difference amplifier 75 and applied by way of lead 80 to the difference amplifier 79. The output of the difference amplifier 79 is a voltage $E_6$ as seen by the curve G of FIG. 6 representing the error signal which is the log of $$\left(\frac{G_1}{G_3}\right)$$

Accordingly, an arrangement is provided in which the center receiving channel is utilized to compensate for amplitude variations in the received radiant energy. As indicated in FIG. 6 the difference between the outputs of the center channel and the tracking channel when the right antenna 12 is switched in are stretched to provide a direct current voltage $E_4$ that corresponds to a right-hand error signal. In like manner, the difference between the tracking channel when the left antenna 15 is switched in, that is, voltage $E_3$ and the voltage from the center channel $E_2$, is stretched to provide a direct current voltage $E_5$ that corresponds to the left-hand error signal. The voltage $E_5$ is then substracted from the right-hand error signal $E_4$ to produce the error signal $E_6$. It should be noted that any unbalance between the center channel and the tracking channel does not have any influence on the amplitude of the error voltage $E_6$.

Until the array is aligned on the selected target, the right and left comparison circuits of the tracking channel have unequal outputs. This unbalance in outputs results in an error signal from the error amplifier 79 and the error signal $E_6$ is applied to the antenna controller 24 and moves the antenna controller in a manner to center or align the antennas on the selected target. The angular position of the antennas after they are aligned may be read off as the angular position of the selected target by any suitable indicating means 92 supplied from the aforementioned lead 82 of FIG. 4. As aforementioned, while the target is being tracked, the right and left-hand search channels function in a search mode. Accordingly, the aforementioned special bias amplifier 47 is provided, and the bias amplifier receives a voltage from the antenna controller 24 which corresponds to the position of the antenna array and this bias voltage is used to alter the amplitude of the pulse on lead 49 in a manner to keep the azimuth scale on the screen of the cathode ray indicator tube centered relative to the axis of the airplane even though the antennas may be looking off at an angle, with the result that the calibration of the screen of the cathode ray tube is not destroyed or altered, and the cursor position corresponds to the true position of the target, and further that the difference amplifier 50 and pulse selector 84 select pulses from the desired target.

It should be understood that elevation apparatus, as shown in FIG. 7 and generally designated 88, and similar to that hereinbefore described is provided, utilizing antennas 17, 16 and 18, providing an indication on the pair of vertical deflection plates in tube 31. The elevation information apparatus has cursor control apparatus 89 with cursor positioning control 90, FIG. 7, and has antenna positioning apparatus 91 which provides an output to target indicator 92.

If desired, the output of pulse selector 84 and the output of a similar pulse selector, not shown, in the elevation apparatus, may be applied to a coincidence circuit and thence to gate generator 58, a single gate on lead 59 being used for both azimuth and elevation circuits.

Whereas the apparatus of the instant invention has been shown and described with reference to an embodiment thereof which gives satisfactory results, it should be understood that the apparatus shown and described is illustrative and that departures may be made and equivalents substituted without departing from the scope of the invention.

I claim as my invention:

1. Passive detection apparatus for tracking a selected target source of radiant energy while at the same time providing directional information about at least one other source of radiant energy comprising, in combination, three directional antennas having overlapping directional patterns of response, moving means mounting said three antennas for movement together in response to a tracking error signal whereby the three directional patterns of response are rotated in the same plane about substantially a common axis, each of said three antennas providing a signal having an amplitude which varies with variations in the direction to a source of radiant energy, direction indicator means providing an indication variable in accordance with variations in the relative amplitudes of two signals simultaneously applied thereto, first circuit means operatively connecting a first one of said three antennas to said indicator means, second circuit means including signal amplitude altering means operatively connecting a second of said three antennas to said indicator means, said signal amplitude altering means being operatively connected to said moving means and in accordance with the instant positions of the three antennas varying the amplitude of the signals in the second circuit means to thereby provide on the direction indicator means true indications of the directions to the selected source and the other source notwithstanding tracking movement of the three antennas, cursor means operatively connected to said direction indicator means for selecting the indication of the target source to be tracked, gate generating means operatively connected to the cursor means and to the first and second circuit means for generating a gate only while signals from the selected source are being received, signal comparison channel means operatively connected to the gate generating means and gated by the gate generated therein, means operatively connected to the first and second antennas for alternately connecting the first and second antennas to the signal comparison channel means at a periodic rate, the third antenna being operatively connected to the signal comparison channel means, the signal comparison channel means comparing the output of the third antenna with the output of the first antenna while connected thereto and comparing the output of the third antenna with the output of the second antenna while connected thereto and providing two difference output signals, angular error signal obtaining means operatively connected to the signal comparison channel means and energized therefrom, and other circuit means connecting the angular error signal obtaining means to the moving means for utilizing the error signal to move the three antennas to track a selected target source of radiant energy.

2. Passive detection apparatus for tracking a selected source of radiant energy representing a selected target while at the same time providing directional information about at least one other source of radiant energy comprising, in combination, means including a plurality of movable directional antennas for obtaining an error signal representing deviation of the instant direction to the target source from a predetermined direction in accordance with the directional patterns of response of said plurality of movable directional antennas, moving means for the plurality of antennas, circuit means operatively connected to said error signal obtaining means and to said moving means for moving the plurality of antennas together in accordance with variations in the error signal to thereby track the selected target source, two signal obtaining means operatively connected to two of said plurality of antennas for obtaining two other signals having amplitudes respectively in accordance with the instant direction to the other source as measured in the directional patterns of response of said two antennas, one of said signal obtaining means including signal amplitude altering means operatively connected to the moving means for altering the amplitude of one of said two signals to compensate for movement of the plurality of antennas, and direction indicator means operatively connected to said two signal obtaining means, said direction indicator means providing an indication variable in accordance with variations in the relative amplitudes of two signals simultaneously applied thereto.

3. In passive detection apparatus for tracking a selected source of radiant energy representing a selected target while at the same time providing directional information about at least one other source of radiant energy, in combination, three directional antennas having overlapping directional patterns of response, movable means mounting said three antennas for movement together, angular error signal obtaining means operatively connected to said three antennas for obtaining an error signal from radiant energy received from the selected target source, said error signal obtaining means including means for alternately comparing the output of a first one of said antennas with a second of said antennas and for comparing the output of said first antenna with the third of said antennas, moving means operatively connected to said error signal obtaining means and to said movable mounting means for moving the three antennas together in accordance with variations in the error signal to thereby track the selected target source, first and second signal obtaining means operatively connected to said second and third antennas respectively for obtaining two other signals having amplitudes respectively in accordance with the instant direction to the other source as measured in the directional patterns of response of said second and third antennas, one of said first and second signal obtaining means including signal amplitude altering means operatively connected to the moving means for altering the amplitude of one of said two signals to compensate for movement of the three antennas, and direction indicator means operatively connected to said first and second signal obtaining means, said direction indicator means being constructed and arranged to provide an indication of the direction to said other source, said indication being variable in accordance with variations in the relative amplitudes of the two signals simultaneously applied to the direction indicator means.

4. Passive detection apparatus for tracking a selected target source of radiant energy while at the same time providing directional information about at least one other source comprising, in combination, three movable antenna means mounted for movement together and having overlapping directional patterns of response, error signal obtaining means operatively connected to all said movable antenna means for obtaining an angular error signal from energy received from the selected target source, moving means operatively connected to said error signal obtaining means and to all said movable antenna means for moving all said antenna means in accordance with variations in said error signal to thereby track the selected target source, direction indicator means providing an indication variable in accordance with variations in the relative amplitudes of two signals simultaneously applied thereto, and circuit means operatively connecting said direction indicator means to two of said antenna means, said circuit means including signal amplitude altering means operatively connected to the moving means for varying the amplitude of the signal from one of said last-named two antenna means in accordance with movement of all said antenna means as the target source is tracked to thereby provide on the indicator means true indications of the directions to the selected source and other source from the passive detection apparatus notwithstanding relative movement of the other source with respect to the directional patterns of response.

5. Passive detection apparatus for tracking a selected target source of radiant energy while at the same time providing directional information about at least one other source comprising, in combination, three movable antenna means mounted for movement together and having overlapping directional patterns of response, angular error signal obtaining means operatively connected to all said movable antenna means for obtaining an error signal, moving means operatively connected to said error signal obtaining means and to all said movable antenna means for moving all said antenna means in accordance with variations in said error signal to thereby track the selected target source, direction indicator means providing an indication variable in accordance with variations in the relative amplitudes of two signals simultaneously applied thereto, circuit means operatively connecting said direction indicator means to two of said antenna means, said circuit means including signal amplitude altering means operatively connected to the moving means for varying the amplitude of the signal from one of said last-named two antenna means in accordance with movement of said two antenna means as the selected target source is tracked to thereby provide on the indicator means true indications of the directions to the selected source and other source from the passive detection apparatus notwithstanding relative movement of the other source with respect to the directional patterns of response, and other circuit means including gating means connecting said circuit means to said error signal obtaining means to gate the error signal obtaining means for use of only signals received from the selected target source.

6. Passive detection apparatus for tracking a selected target source of radiant energy while at the same time providing directional information about at least one other source comprising, in combination, three movable antennas mounted for movement together and having overlapping directional patterns of response, signal comparison means operatively connected to said three antennas for comparing the outputs of the first and second of said three antennas and for comparing the outputs of the first and third of said antennas, angular error signal obtaining means operatively connected to the signal comparison means and energized therefrom for obtaining an error signal from energy received from the selected target source, moving means operatively connected to said error signal obtaining means and to all three of said movable antennas for moving all three antennas in accordance with variations in said error signal to thereby track the selected target source, direction indicator means providing an indication variable in accordance with variations in the relative amplitudes of two signals simultaneously applied thereto, and circuit means operatively connecting said indicator means to the second and third of said antennas, said circuit means including signal amplitude altering means operatively connected to the moving means for varying the amplitude of the signal from the third antenna in accordance with movement of all said antennas as the target source is tracked to thereby provide on the indicator means true indications of the directions to the selected source and other source from the passive detection apparatus notwithstanding relative movement of the other source with respect to the directional patterns of response.

7. Passive detection and direction finding apparatus for tracking a selected target source of radiant energy while at the same time providing directional information about at least one other source comprising, in combination, three movable antennas mounted for movement together and having overlapping directional patterns of response, angular error signal obtaining means including signal comparing means connected to said three movable antennas for obtaining an angular error signal, moving means operatively connected to said error signal obtaining means and to all said movable antennas for moving all said antennas together in accordance with variations in said error signal to thereby track the selected target source, direction indicator means providing an indication variable in accordance with variations in the relative amplitudes of two signals simultaneously applied thereto, circuit means operatively connecting said indicator means to two of said antennas, said circuit means including signal amplitude altering means operatively connected to said moving means for varying the amplitude of the signal from one of said two last-named antennas in accordance with movement of all said antennas as the target source is tracked to thereby provide on the indicator means true indications of the directions to the selected source and other source from the passive detection apparatus notwithstanding relative movement of the other source with respect to the directional patterns of response, and other circuit means including gating means operatively connecting said circuit means to said error signal obtaining means to gate the error signal obtaining means for use of only signals received from the selected target source.

8. Passive detection apparatus for tracking a selected target source of radiant energy while at the same time providing directional information about at least one other source of radiant energy comprising, in combination, three directional antennas having overlapping directional patterns of response, moving means mounting said three antennas for movement together in response to a tracking error signal whereby the three directional patterns of response are rotated in the same plane about substantially a common axis, each of said three antennas providing a signal having an amplitude which varies with variations in the direction to a source of radiant energy, direction indicator means providing an indication variable in accordance with variations in the relative amplitudes of two signals simultaneously applied thereto, first circuit means operatively connecting a first one of said three antennas to said indicator means, second circuit means including signal amplitude altering means operatively connecting a second of said three antennas to said indicator means, said signal amplitude altering means being operatively connected to said moving means and in accordance with the instant positions of the three antennas varying the amplitude of the signal in the second circuit means to thereby provide on the direction indicator means true indications of the directions to the selected source and the other source notwithstanding tracking movement of the three antennas, cursor means operatively connected to said direction indicator means for selecting the indication of a target source to be tracked, gate generating means operatively connected to the cursor means and to the first and second circuit means for generating a gate only while signals from the selected source are being received, error signal obtaining means operatively connected to said three antennas, said error signal obtaining means comparing the outputs of the three antennas to obtain an angular error signal, other circuit means connecting the error signal obtaining means to the gate generating means whereby an error signal is generated only in response to energy received from the selected source, and further circuit means operatively connecting the angular error signal obtaining means to the moving means for utilizing the error signal to move the three antennas to track a selected target source of radiant energy.

9. Passive detection apparatus for tracking a selected target source of radiant energy while at the same time providing directional information about at least one other source of radiant energy comprising, in combination, three directional antennas having overlapping directional patterns of response, moving means mounting said three antennas for movement together in response to a tracking error signal whereby the three directional patterns of response are rotated in the same plane about substantially a common axis, each of said three antennas providing a signal having an amplitude which varies with variations in the direction to a source of radiant energy, direction indicator means providing an indication variable in accordance with variations in the relative amplitudes of two signals simultaneously applied thereto, first circuit means operatively connecting a first one of said three antennas to said indicator means, second circuit means including signal amplitude altering means operatively connecting a second of said three antennas to said indicator means, said signal amplitude altering means being operatively connected to said moving means and in accordance with the instant positions of the three antennas varying the amplitude of the signal in the second circuit means to thereby provide on the direction indicator means true indications of the directions to the selected source and other source notwithstanding tracking movement of the three antennas, difference amplifier means having the output of the first circuit means and the output of the second circuit means after alteration by the signal amplitude altering means applied thereto, signal selector means operatively connected to said difference amplifier means, gate generator means operatively connected to said signal selector means and having the generation of the gate therein controlled by the output of the signal selector means, signal comparison channel means, means operatively connected to the first and second antennas for alternately connecting the first and second antennas to the signal comparison channel means at a periodic rate, the third antenna being operatively connected to the signal comparison channel means, the signal comparison channel means comparing the output of the third antenna with the output of the first antenna and comparing the output of the third antenna with the output of the second antenna and providing two difference output signals, angular error signal obtaining means operatively connected to the signal comparison channel means and energized therefrom, circuit means connecting the angular error signal obtaining means to the moving means for utilizing the error signal to move the three antennas to track a selected target source of radiant energy, and further circuit means connecting the gate generator means to the signal comparison channel means, the gate generated by the gate generator means being utilized by the signal comparison channel means to gate the signal comparison channel means and ensure that only signals received from the selected target source are utilized for providing said angular error signal.

10. Passive detection apparatus for tracking a selected target source of radiant energy while at the same time providing directional information about at least one other source of radiant energy comprising, in combination, three directional antennas having overlapping directional patterns of response, moving means mounting said three antennas for movement together in response to a tracking error signal whereby the three directional patterns of response are rotated in the same plane about substantially a common axis, each of said three antennas providing a signal having an amplitude which varies with variations in the direction to a source of radiant energy, direction indicator means providing an indication variable in accordance with variations in the relative amplitudes of two signals simultaneously applied thereto, first circuit means operatively connecting a first one of said three antennas to said indicator means, second circuit means including signal amplitude altering means operatively connecting a second of said three antennas to said indicator means, said signal amplitude altering means being operatively connected to said moving means and in accordance with the instant positions of the three antennas varying the amplitude of the signal in the second circuit means to thereby provide on the direction indicator means true indications of the directions to the selected source and other source notwithstanding tracking movement of the three antennas, cursor means operatively connected to said direction indicator means for selecting the indication of a target source to be tracked, difference amplifier means operatively connected to the first circuit means and the second circuit means, the signal in the second circuit means after alteration by the signal amplitude altering means being applied to the difference amplifier means, signal selector means operatively connected to the difference amplifier means and having the output of the difference amplifier means applied thereto, said signal selector means also being connected to said cursor means, gate generator means operatively connected to said signal selector means and generating a gate when a signal is passed by the signal selector means, a signal being passed by the signal selector means only while signals from the selected target source are being received, signal comparison channel means, additional circuit means connecting the gate generator means to the signal comparison channel means for gating the signal comparison channel means, means operatively connected to the first and second antennas for alternately connecting the first and second antennas to the signal comparison channel means at a periodic rate, the third antenna being operatively connected to the signal comparison channel means, the signal comparison channel means comparing the output of the first antenna and comparing the output of the third antenna with the output of the second antenna and providing two difference output signals, angular error signal obtaining means operatively connected to the signal comparison channel means and energized therefrom, and further circuit means connecting the angular error signal obtaining means to the moving means for utilizing the error signal to move the three antennas to track a selected target source of radiant energy.

11. Passive detection and direction finding apparatus for tracking a selected target source of pulsed radiant energy while at the same time providing directional information about at least one other pulsed source of radiant energy comprising, in combination, three directional antennas having overlapping directional patterns of response, moving means mounting said three antennas for movement together in response to a tracking error signal whereby the three directional patterns of response are rotated in the same plane about substantially a common axis, each of said three antennas providing a signal having an amplitude which varies with variations in the direction to the source of radiant energy, direction indicator means providing an indication variable in accordance with variations in the relative amplitudes of two pulses simultaneously applied thereto, first circuit means operatively connecting a first one of said three antennas to said indicator means, said first circuit means including pulse stretching means, second circuit means including pulse stretching means and including pulse amplitude altering means operatively connecting a second of said three antennas to said indicator means, said pulse amplitude altering means being operatively connected to said moving means and in accordance with the instant positions of the three antennas varying the amplitude of the pulse in the second circuit means to thereby provide on the direction indicator means true indications of the directions to the selected source and other source notwithstanding tracking movement of the three antnenas, cursor means operatively connected to said direction indicator means for selecting the indication of a target source to be tracked, gate generating means operatively connected to the cursor means and to the first and second circuit means for generating a gate only while signals from the selected source are being received, signal comparison channel means operatively connected to the third of said three antennas, lobe switching means operatively connected to the first and second antennas and to the signal comparison channel means for alternately connecting the first and second antennas to the signal comparison channel means at a periodic rate, said lobe switching means providing that the signal comparison channel means alternately compares the output of the first antenna with the output of the third antenna and compares the output of the second antenna with the output of the third antenna, the signal comparison channel means providing two difference output signals, angular error signal obtaining means operatively connected to the signal comparison channel means and energized therefrom, circuit means connecting the angular error signal obtaining means to the moving means for utilizing the error signal to move the three antennas to track a selected target source of radiant energy, and other circuit means connecting the gate generating means to the signal comparison channel means to gate the signal comparison channel means and insure that only radiant energy received from the selected target source is utilized in providing said angular error signal.

References Cited in the file of this patent

UNITED STATES PATENTS

| | | |
|---|---|---|
| 2,426,218 | Hopgood | Aug. 26, 1947 |
| 2,617,982 | Holschuh et al. | Nov. 11, 1952 |
| 2,784,400 | Ehrenfried | Mar. 5, 1957 |
| 2,855,592 | Busignies | Oct. 7, 1958 |